Jan. 12, 1954
P. G. ANJANOS
2,665,583
WIND SPEED AND DIRECTION INDICATOR
Filed July 12, 1951
3 Sheets-Sheet 1
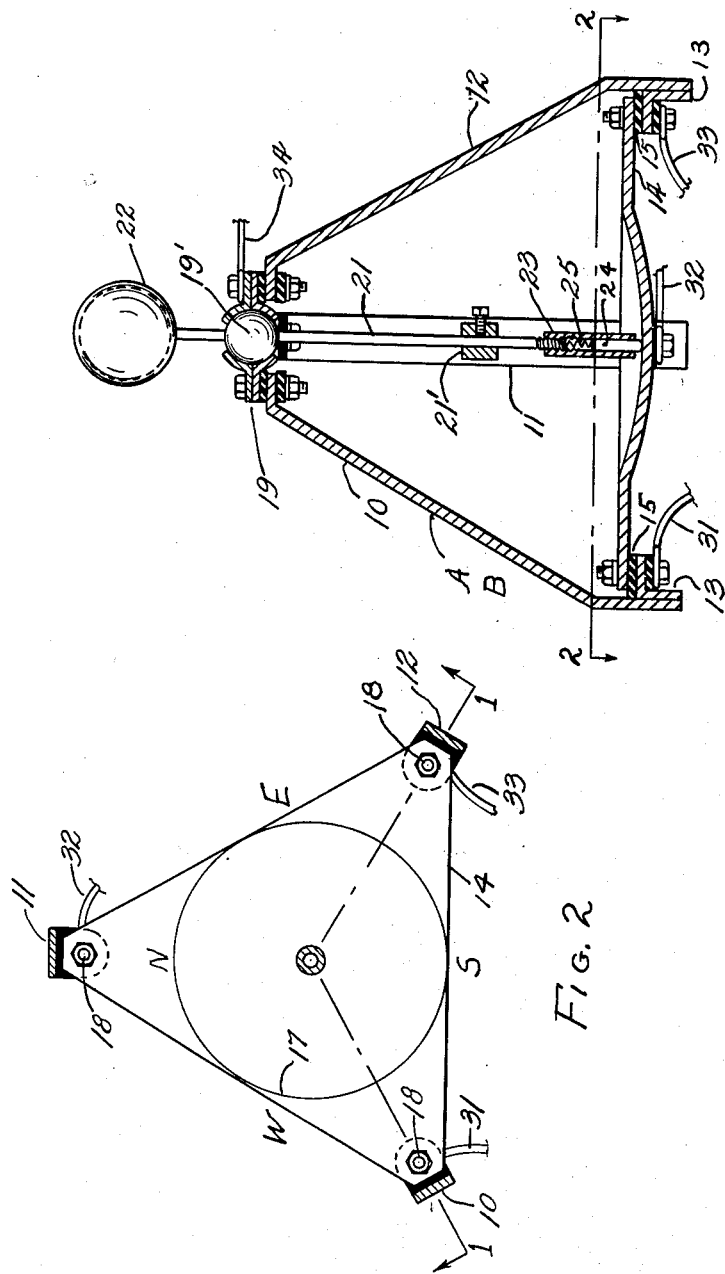
INVENTOR.
PHILIP G. ANJANOS
BY  *a.S.Krob*
ATTORNEY

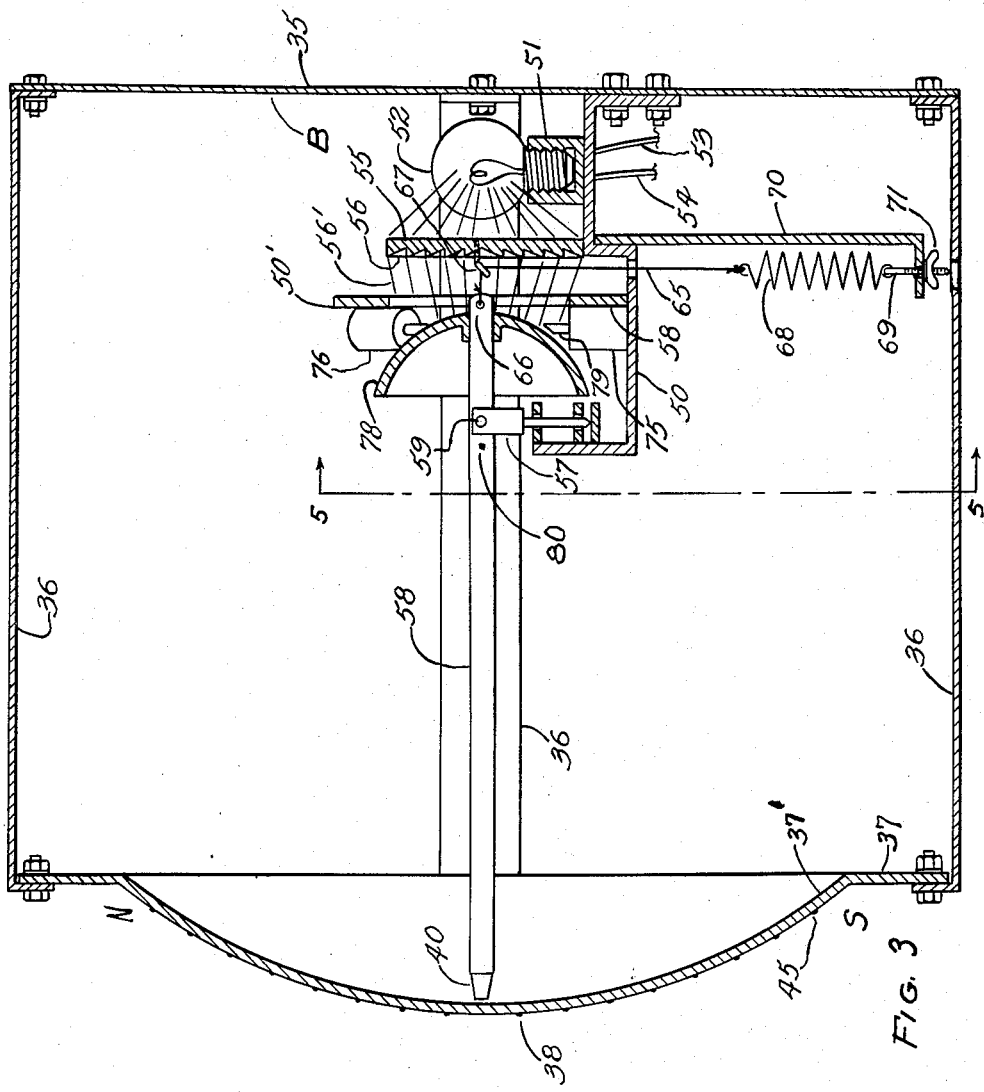

Jan. 12, 1954   P. G. ANJANOS   2,665,583
WIND SPEED AND DIRECTION INDICATOR
Filed July 12, 1951   3 Sheets-Sheet 3
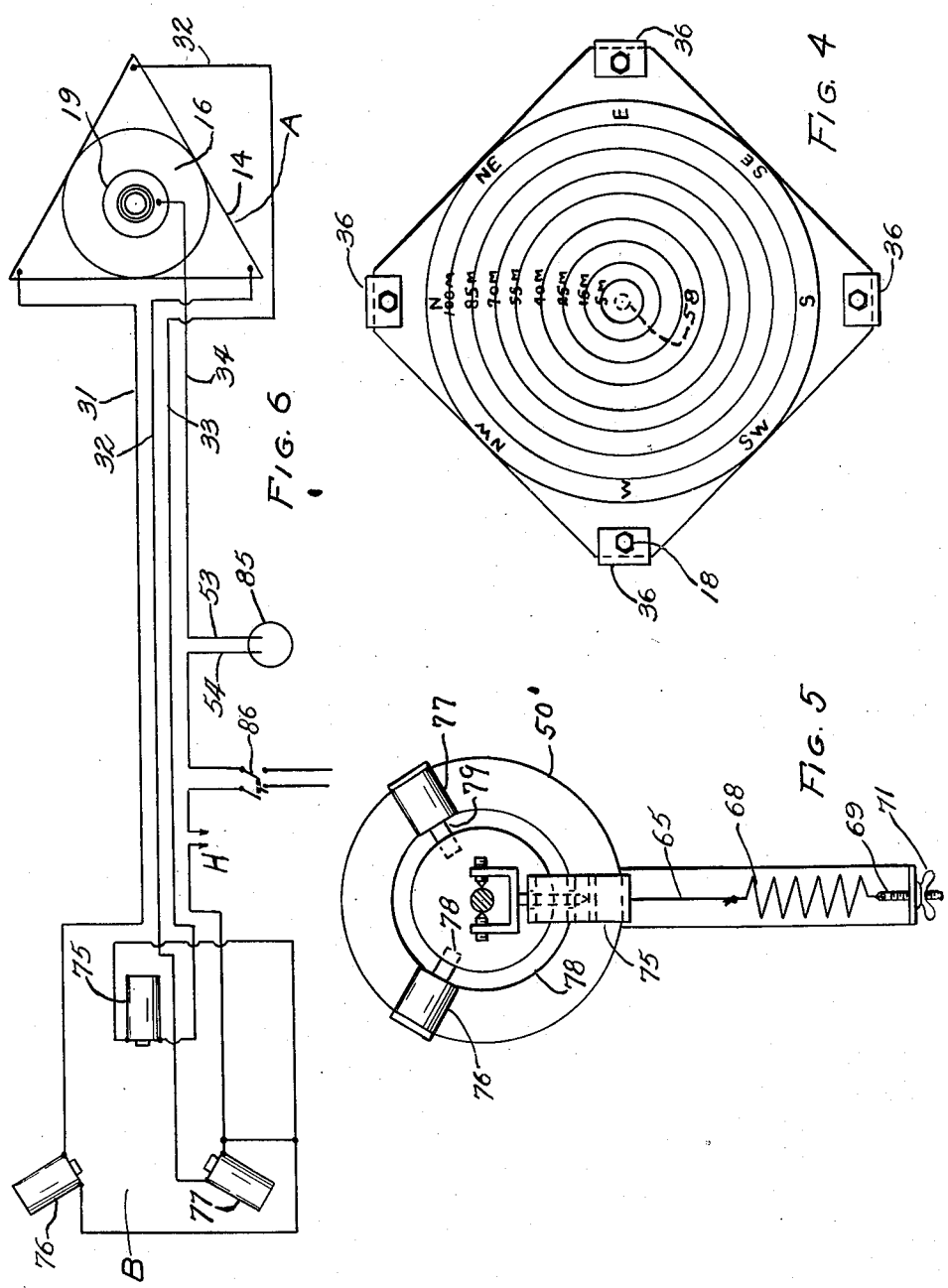
INVENTOR.
PHILIP G. ANJANOS
BY
A. S. Krotz
ATTORNEY Patented Jan. 12, 1954

2,665,583

UNITED STATES PATENT OFFICE 2,665,583

WIND SPEED AND DIRECTION INDICATOR

Philip G. Anjanos, Beloit, Wis.

Application July 12, 1951, Serial No. 236,430

3 Claims. (Cl. 73—189)

The present invention relates to a wind speed and direction indicator wherein the transmitter unit may be remote from the receiving unit and wherein the receiving unit is controlled electrically by the transmitter unit.

The principal object of the present invention is to provide a wind speed and direction indicator wherein the speed and direction of the wind is accurately indicated on preferably a translucent receiver plate by simply pressing a button. However applicant's device is adapted when desired to continuously indicate the speed and direction on the translucent plate.

An object of the present invention is to provide a transmitter station which is simple and can be positioned on the top of a pole or building or otherwise, and wherein the receiver may be positioned in any desired locality in a room or office where the speed and direction of the wind may be conveniently observed.

Generally stated, objects of the present invention are to provide a device of the character which can be manufactured at very low cost and is capable of operating continuously without requiring attention.

To these and other useful ends my invention consists of parts, combinations of parts or their equivalents and mode of operation as hereinafter described and claimed and shown in the accompanying drawings in which:

Fig. 1 is an elevational view partially sectioned on line 1—1 of Figure 2, illustrating my improved transmitter station.

Fig. 2 is a top view of the transmitter taken on lines 2—2 of Figure 1.

Fig. 3 is a side elevational view partially sectioned of the receiving unit of my device.

Fig. 4 is a front view of the translucent indicator plate.

Fig. 5 is a front view taken on line 5—5 of Figure 3.

Fig. 6 is a diagrammatic drawing illustrating the complete electric circuits and illustrating their connections to the operating parts of the transmitting and receiving units.

As thus illustrated the transmitter station in its entirety is designated by reference character A. The receiving unit is in its entirety, designated by reference character B.

It will be understood that the four wires leading from the transmitter station A to the receiving unit B may be enclosed in a cable, and that these units may be any desired distance apart.

Member A has three frame posts 10, 11 and 12 arranged preferably in a triangle. Near the bottom ends of these frame posts I secure angle brackets 13. I provide preferably a triangular member 14 which is concave on its upper side as shown in Figure 1, its corners being secured to members 13 by means of insulating members 15, so that member 14 is insulated from frame posts 10, 11 and 12.

It will be understood that member 14 has medium conductivity qualities, thus making it possible for the passing current from contact point 24 to cause member 40 to follow the relative position of member 24 on member 37.

It will be noted that concave surface 16 terminates as at 17 so that the periphery of this member registers with a line drawn substantially between bolts 18, these bolts are used for securing the corners of member 14 to angle brackets 13. Members 10, 11 and 12 converge upwardly and are secured to an internally spherically shaped bracket 19 adapted to freely embrace a bearing sphere 20 in which a rod 21 is secured. Mounted on the upper end of the rod is a hollow sphere 22 for contact with the wind. On the bottom of member 21 I screw thread a sleeve 23, within the bottom of this sleeve I slidably mount a contact brush 24 and provide a spring 25 which is adapted to yieldingly hold member 24 against concave surface 16, for a purpose of calibrating I adjustably mount a weight 21' on member 21.

Member 22 is exposed to the wind in any convenient member so member 24 may contact any point on concave member 16, depending upon the velocity and direction of the wind. Member 22 is hollow and very light and the total weights of members 21', 23, 24 and 25 is adapted to resist the action of the wind on member 22 so as to cause brush 24 to accurately indicate the wind speed and direction on surface 16. The design being such as will preferably move brush 24 to the periphery of member 16 at say a speed of 90 miles per hour.

From the next above paragraph it will be seen that if the portion of the periphery marked with an N is directly toward the north (see Figure 2) and the wind is blowing from the north at a speed of 90 miles per hour, brush 24 will contact surface 16 near the periphery of this member and at N. Thus brush 24 will indicate any speed and direction of travel of the wind. Wires 31, 32 and 33 are connected to the corners of member 14 and a wire 34 is connected to member 19. These 4 wires lead to unit B for a purpose which will hereinafter appear.

I will now describe my receiving member B which comprises a preferably rear frame plate 35 and four corner members 36 secured thereto as indicated and extending forward to a translucent plate 37 as clearly illustrated in Figure 4. This translucent plate has on its rear side a centrally positioned concave surface 37', the front surface of which has a number of spaced circles 38—45 which are printed on the front of member 37, indicated in full lines in Figure 4. The object of these lines will hereinafter appear.

I mount a bracket 50 on plate 35 which acts as a support for a number of elements as follows: on the rear end of member 50 I mount a lamp socket 51 for holding a lamp bulb 52 and having the necessary structure (not shown) suitably connected to wires 53 and 54. A glass reflector plate 55 is mounted on member 50 as illustrated having circular serrations 56, adapted to direct the light rays 56' rearwardly and inwardly. Bracket 50 has pivotally mounted therein another bracket 57 to which preferably a translucent ray-conducting rod 58 is pivoted as at 59. It will be seen that rod 58 is pivoted to bracket 50 by means of a universal joint. The front end of member 58 terminates adjacent surface 37', its end being preferably tapered as at 40.

It will be seen that because of the pivoted mounting of member 57 and pivot 59 member 58 at its front end may travel over the entire surface of member 37'.

I provide means for normally holding member 58 in its central position as illustrated in Figure 3 and in the position shown in Figure 4 by dotted circle and also permit member 58 at 40 to travel in any direction over the face of member 37' because of a very flexible and light wire cable 65 secured to the rear end of member 58 as at 66, passing freely through an anchor 67 secured to the center of member 55. The lower end of member 65 is secured to a spring 68 which is anchored to a threaded bolt 69, the bolt extending freely through a depending bracket 70 as indicated, and having a thumb nut 71 for adjusting the tension of spring 68 for a purpose which will hereinafter appear.

It will be seen from the foregoing that in whatever position member 58 may be when viewing member 37' from the front, a light spot will appear. The electrical connections from member A are made whereby the direction and velocity of the wind will be indicated by circular lines 38—46 on the front of member 37 and the mechanism may be adapted so line 38 will represent a speed of 5 miles per hour, line 39, 15 miles per hour, line 40, 25 miles per hour and up to ninety miles per hour if the bright spot is on line 46 and of course, the direction of wind will also be indicated by the position of the bright spot on or near one of the circles. For example, if the bright spot is on line 45, half way between north and west, the direction of the wind would be indicated as coming from the north-west and at 45 miles per hour.

The control of member 58 resides preferably in three magnetic coils, 75, 76 and 77 secured to member 50' in any suitable manner, each coil having an iron core 79, the cores of the coils extending close to the rear surface of member 78 as illustrated.

It will be noted that the rear surface of member 78 is curved on a radius at a point 80 slightly in front of pivot 59, so as member 58 moves away from its central position, surface 78 will approach or move slightly toward cores 79 (see Figure 3) thus giving the cores a greater magnetic pull if such an expedience is necessary. Clearly surface 78 may, if necessary, be changed so its center of curvature is at or in rear of pivot 59. Thus it will be seen that the curvature 78 or the radius on which this curvature is formed, may be changed for calibrating the instrument. Lines 38 through 46 may be variously spaced also for calibrating purposes. This however may not be necessary because of adjusting nut 71 which may be used for the purpose. Clearly the operating parts may be positioned and designed so the light spot will accurately indicate the velocity and direction of the wind.

Referring now to Figure 6. It will be seen that receiving instrument B may be positioned remote from member A and positioned on the wall of an office or elsewhere with the top of 37 marked N or north, the bottom marked S or south, the extreme right marked E or east and the extreme left marked W or for west, and wires 31, 32 and 33 connected to coils 75, 76 and 77, so the bright spot on member 37 will exactly correspond with the position of brush 24. The single wire 34 is connected to the other side of the coils 75, 76 and 77, this wire having in series therewith a light bulb 85, a connection to the source of electrical supply H and a control switch 86, the plan being to use either a switch or push button at this point so as to economize on current, thus using current only when an attendant wishes to ascertain the direction and speed of the wind.

I shall now describe in detail just why the bright spot on member 37 will always correspond substantially with the position of brush 24. It will be noted that bolts 18 substantially are in line with the periphery of number 16 as at 17. With this arrangement, clearly when the electric current is on and the wind is blowing, for example from the north the greater volume of the current passing will be equally divided between wires 31 and 32, and if, for example, the wind is from the south, the majority of the current will pass through wire 32. Thus the current will be largely through 1 or 2 wires depending upon the direction of the wind, if for example (see Figure 2) the wind is from the north, the larger portion of the current will pass through wire 32, because member 24 is moved toward north a distance equal to the speed of the wind, depending upon the position of brush 34, when wires 31, 32 and 33 are properly connected to the three coils 75, 76 and 77 and members A and B properly positioned, the action of the cores of the coils 75, 76 and 77 on member 78 will cause member 58 at 60 to be positioned so the light spot will always correspond with the position of brush 24.

It will be understood that my device need not be limited to three coils and three connections to station A. For example member 14 may be hexagonal in shape, thus requiring six coils, six points evenly positioned around 16 and six connecting wires, and preferably so a line between each point will substantially contact the periphery of member 16.

I prefer however, a triangular shape plate 14, as the simplest method for securing the desired results.

Clearly minor changes may be made in the various parts illustrated so as to bring about an accurate indication of wind speed and direction, without departing from the spirit and scope of the appended claims.

Having thus shown and described my invention, I claim:

1. In a wind speed and direction indicator of the character described comprising in combination, separate transmitting and receiving units, said transmitting unit having a horizontally positioned plate with current resisting characteristics and having a concave surface on its upper side, a pendulum universally pivoted a distance above said concave surface and on the horizontal center thereof, said pendulum having means to yieldingly hold it in a vertical position, a brush on the lower end of said pendulum adapted to yieldingly contact said concave surface, said pendulum being extended a distance above said universal pivot and having mounted on its upper end a wind engaging means whereby the position of the brush on said concave surface will correspond to the velocity and direction of the wind, said receiving unit having a translucent plate with a circular concave surface on one side, an arm universally pivoted near one end and on a radius with said translucent plate and at the center of the curvature thereof with means to yieldingly hold the arm in a central position relative to the concave translucent surface, one end of said arm being adjacent said translucent concave surface and having means for spot lighting the concave surface, a bell shaped iron member secured to said rod adjacent said universal pivot, a number of coils having cores which are equally spaced around and adjacent the outer surface of said bell shaped iron member, wires leading from one side of said coils to an equal number of circumferentially spaced connections near the periphery of said plate concave surface, a single wire electrical connection between said pendulum and the other side of said coils having a connection to a source of electric supply, a number of concentrically arranged spaced lines on the convex side of said translucent member and concentric with its convex surface, letters positioned on the periphery of said convex surface, said transmitting and receiving units being positioned whereby by viewing the convex side of the translucent member said spot light will indicate the direction and velocity of the wind.

2. A device as recited in claim 1, characterized by the fact that there are three coils and three connections to said receiving unit plate, as and for the purpose specified.

3. In a wind speed and direction indicator of the character described comprising in combinature, separate transmitting and receiving units, said transmitting unit having a horizontally positioned plate with current resisting characteristics, and having a concave surface on its upper side, a pendulum universally pivoted a distance above said concave surface and on the horizontal center thereof, the pendulum having means to yieldingly hold it in a vertical position, a brush on the lower end of said pendulum adapted to yieldingly contact said concave surface, said pendulum being extended a distance above said universal pivot and having mounted on its upper end a wind engaging means whereby the position of the brush on said concave surface will correspond to the velocity and direction of the wind, said receiving unit having a vertically arranged translucent plate with a concave surface on its forward side, an arm universally pivoted near its forward end and on a radius with the center of said concave surface and having means for yieldingly holding the arm in a central position, the rear end of said arm having means for spot lighting said concave surface whereby the position of the rear end of said arm will be indicated by the spot light on the rear side of said translucent plate, means on said receiving unit having electrical connections to said transmitting unit with a connection to a source of electric power, said connections having means adapted to cause the rear end of said arm to follow the movement of said brush, said translucent concave plate having on its rear side spaced, concentric circular lines and markings, said transmitter and receiving units being positioned whereby the speed and direction of the wind will be indicated by the spot light on the rear side of said translucent surface.

PHILIP G. ANJANOS.

References Cited in the file of this patent

UNITED STATES PATENTS

| Number | Name | Date |
|---|---|---|
| 2,089,099 | Kahn | Nov. 2, 1937 |
| 2,125,365 | Waller | Aug. 2, 1938 |
| 2,462,577 | Warren | Feb. 22, 1949 |